United States Patent [19]

Yamagishi et al.

[11] Patent Number: 4,977,953
[45] Date of Patent: Dec. 18, 1990

[54] LATENT HEAT REGENERATING APPARATUS

[75] Inventors: Katsuaki Yamagishi; Koji Kashima; Akio Mitani, all of Yokohama; Masatoshi Shimura, Mishima, all of Japan

[73] Assignee: Kabushiki Kaisha Toshiba, Kawasaki, Japan

[21] Appl. No.: 330,341

[22] Filed: Mar. 28, 1989

[30] Foreign Application Priority Data

Mar. 31, 1988 [JP] Japan .................................. 63-76134

[51] Int. Cl.⁵ ............................................. F28D 20/00
[52] U.S. Cl. .................................. 165/10; 165/104.11;
62/3.2; 62/3.3; 62/238.6; 62/238.7; 62/430;
62/437; 126/263
[58] Field of Search ................ 165/10, 104.11; 62/3.1,
62/3.2, 3.3, 430, 238.6, 238.7, 437; 126/263

[56] References Cited

U.S. PATENT DOCUMENTS 4,461,153  7/1984  Lindner et al. ........................ 62/3.2

FOREIGN PATENT DOCUMENTS 52-22460  6/1977  Japan .
61-34075  8/1986  Japan .

*Primary Examiner*—Albert W. Davis, Jr.
*Attorney, Agent, or Firm*—Cushman, Darby & Cushman

[57] ABSTRACT

A latent heat regenerating apparatus includes a regenerative tank wherein a latent heat regenerative material is housed. The material has a phase transition temperature and a supercooling-release temperature and is capable of maintaining a supercooled-state in a temperature range between the temperatures. A thermoelectric cooling element is located in the regenerative material so as to control supercooling of the material. The element has a heat radiating portion for radiating heat into the material and a heat absorbing portion for absorbing heat from the material, thereby cooling that portion of the material near the absorbing portion to a temperature lower than the supercooling-release temperature.

19 Claims, 5 Drawing Sheets

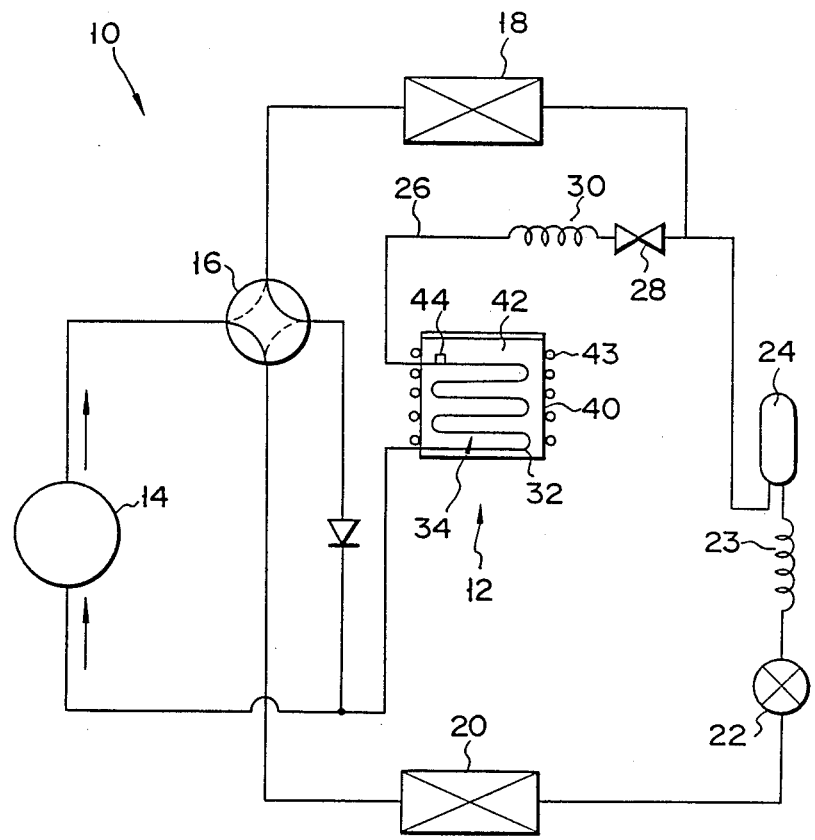
F I G. 1

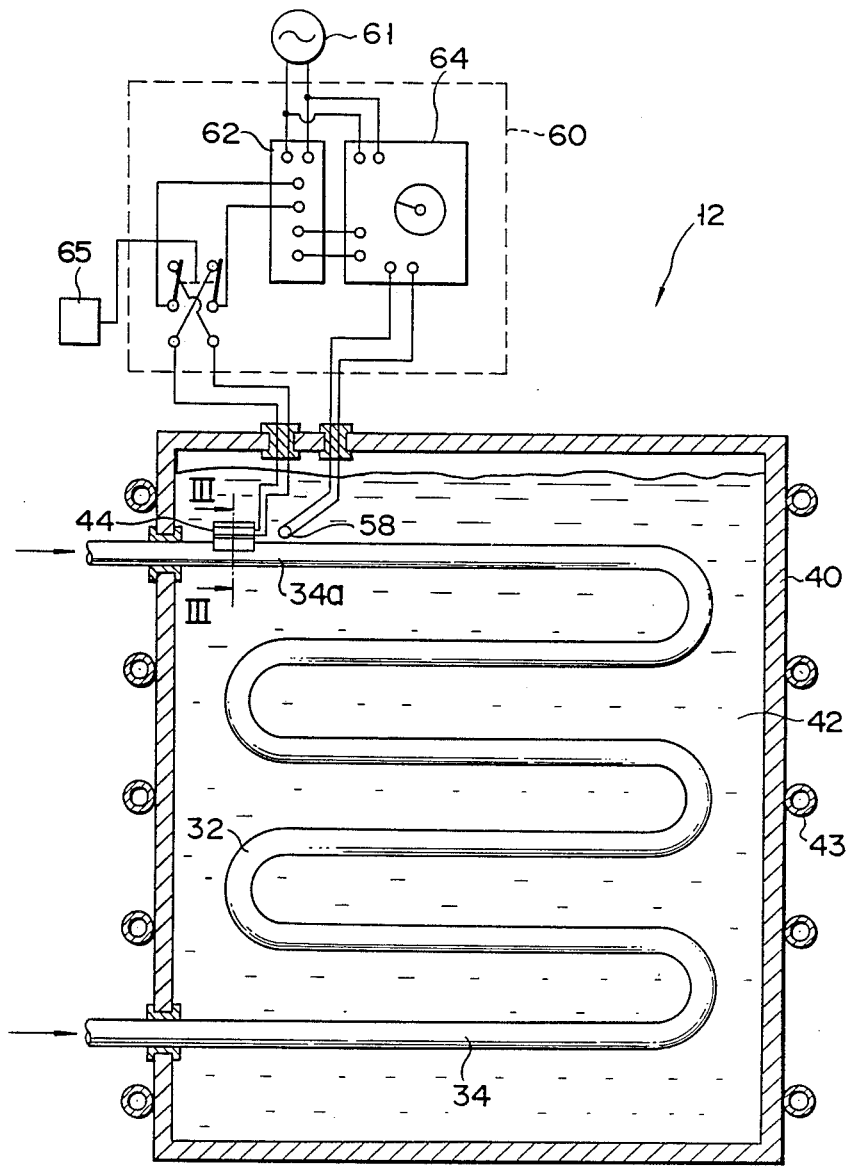
F I G. 2

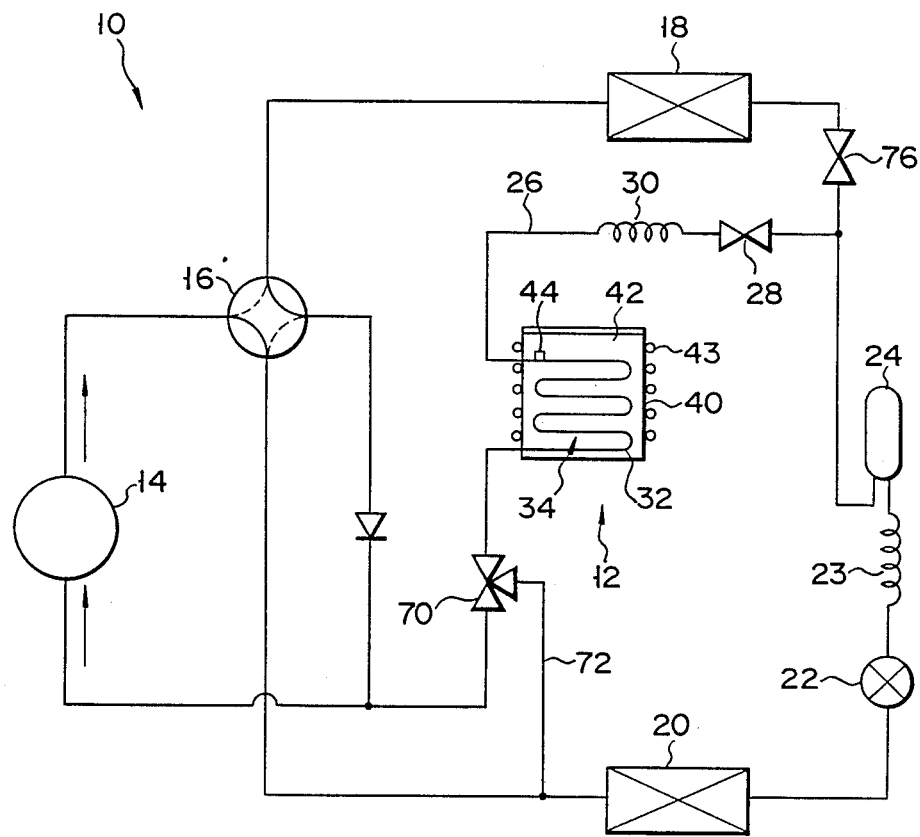
F I G. 7

LATENT HEAT REGENERATING APPARATUS

Background of the Invention

1. Field of the Invention

The present invention relates to a latent heat regenerating apparatus.

2. Description of the Related Art

Recently, there have been provided air conditioners which combine a refrigeration cycle capable of both cooling and heating operations and a regenerating apparatus. In the air conditioners of this type, heat is accumulated in a regenerative material of the regenerating apparatus at night. The accumulated heat is used to heat a refrigerant in heating start operation of the refrigeration cycle, thereby enabling quick start of the heating operation. In the cooling operation of the refrigeration cycle, on the other hand, the heat in the regenerative material is utilized for cooling the refrigerant, thus improving the cooling capability of the cycle.

A latent heat regenerative material is used as the regenerative material of the regenerating apparatus. In general, the regenerative material of this type produces the so-called supercooling effect. Thus, once the regenerative material is cooled after being heated above its phase transition temperature to be melted, it maintains a liquid state, without solidifying, even though it is cooled below the phase transition temperature. This is a supercooled state, which is maintained until the regenerative material is cooled below a supercooling-off temperature. In such a supercooled state, the latent heat of the regenerative material can be utilized for nothing In order to utilize the latent heat accumulated in the regenerative material, or to accumulate the latent heat efficiently in the material, therefore, it is necessary to securely remove the supercooled state or prevent the regenerative material from being supercooled.

Thereupon, improved regenerating apparatuses have recently been developed. These apparatuses are provided with a supercooling control device for controlling the supercooling of the regenerative material. One such apparatus is disclosed in Japanese Patent Publication No. 61-34075, for example. This apparatus comprises a vessel and a regenerative material therein adapted for supercooling. In this regenerating apparatus, moreover, a thermoelectronic cooling element, for use as the supercooling control device, utilizing the Peltier effect, is arranged outside the vessel. The element includes a heat radiation-side metal piece and an absorption-side metal piece, facing each other, and p-and n-type semiconductors arranged between the metal pieces. The absorption-side piece is kept in contact with the regenerative material in the vessel by means of a copper rod and a wick (fibrous material). The radiation-side piece is in contact with the outside air.

When the element with the aforementioned construction is energized, a temperature difference corresponding to the capacity of the element is caused between the radiation—and absorption—side metal pieces. In other words, the absorption-side piece is cooled to a temperature lower than that of the radiation-side piece by the aforesaid difference. For example, water may be used as the regenerative material. The phase transition temperature and supercooling-off temperature of water are 0° C. and about −12° C., respectively. If that portion of the regenerative material around the absorption-side piece is cooled below −12° C. by energizing the thermoelectronic cooling element to cool the piece, it is released from the supercooled state and solidifies immediately. This removal of the supercooled state propagates through the wick to the regenerative material in the vessel, thus fostering the phase change of the material. If the regenerative material in the vessel is already in the supercooled state, therefore, this state is removed. If the material is being cooled from a melted state, it is prevented from being supercooled, and solidifies immediately at the phase transition temperature.

However, the regenerating apparatus constructed in this manner has the following problems.

Since the radiation-side metal piece of the element is in contact with the outside air, its temperature changes depending on the change of the outside air temperature. Also, the cooling temperature of the absorption-side metal piece is determined on the basis of the temperature of the radiation-side piece. If the temperature of the radiation-side piece changes, the cooling temperature of the absorption-side piece also changes. Thus, if the temperature of the radiation-side metal piece becomes very high one day in summer, for example, as the outside air temperature increases, the cooling temperature of the absorptionside piece sometimes may not be lowered below the supercooling-off temperature of the regenerative material. In such a case, the regenerative material can neither be released from the supercooled state nor be prevented from being supercooled. In consequence, this conventional regenerating apparatus lacks reliability.

Further, the phase change of that portion of the regenerative material around the absorption-side metal piece propagates through the wick to the regenerative material in the vessel. In this arrangement, however, the speed of propagation of the phase change is lowered by the length of the wick and the like, so that the phase change of the regenerative material in the vessel is subject to a delay. Thus, the latent heat of the regenerative material cannot be taken out to be used in a well-timed manner, and the control of the supercooling is difficult.

Summary of the Invention

The present invention has been contrived in consideration of these circumstances, and its object is to provide a latent heat regenerating apparatus, capable of securely preventing a regenerative material from being supercooled, and of releasing the material from a supercooled state, without a time delay.

In order to achieve the above object, according to a regenerating apparatus according to the present invention, a thermoelectronic refrigerating element of supercooling control means is disposed in a regenerative material in a regenerative tank so that heat radiating and absorbing portions of the element can radiate to and absorb heat from the regenerative material. Accordingly, the heat radiating portion of the element can stably cool the heat absorbing portion to a temperature below the supercooling-off temperature of the regenerative material, without being influenced by the outside air temperature. Thus, the regenerative material can be securely released from a supercooled state or prevented from being supercooled. Since the heat absorbing portion of the element is located in the regenerative material, moreover, phase change of that portion of the material around the absorbing portion propagates immediately to all the regenerative material in the regenerative tank. In consequence, latent heat can be taken out of the regenerative material without a time delay, and the removal of supercooled state can be controlled with ease.

Brief Description of the Drawings

FIGS. 1 to 4 show an air conditioner with a latent heat regenerating apparatus according to an embodiment of the present invention, in which FIG. 1 is a diagram schematically showing an outline of the air conditions, FIG. 2 is a sectional view of the regenerating apparatus, FIG. 3 is a sectional view of a supercooling control device as taken along line III—III of FIG. 2 and FIG. 4 is a diagram showing the temperature-heat characteristic of a regenerative material;

FIG. 7 is a diagram schematically showing an outline of an air conditioner with a latent heat regenerating apparatus according to a second embodiment of the invention.

Detailed Description of the Preferred Embodiments

Figure 3:
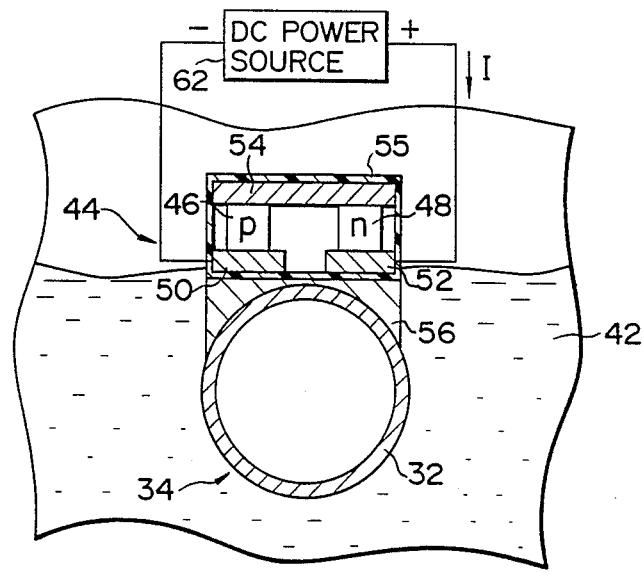

Preferred embodiments of the present invention will now be described in detail with reference to the accompanying drawing.

FIG. 1 shows an air conditioner with a regenerative apparatus according to an embodiment of the present invention.

As is shown in FIG. 1, the air conditioning apparatus comprises refrigeration cycle 10 and latent heat regenerating apparatus 12 incorporated therein. The refrigeration cycle includes compressor 14, four-way valve 16 connected to the discharge and suction sides of the compressor, and indoor and outdoor heat exchangers 18 and 20 connected to the four-way valve. Expansion valve 22, capillary tube 23, and drier 24 are connected between heat exchangers 18 and 20. Refrigeration cycle 10 also includes by-pass 26, one end of which is connected between indoor heat exchanger 18 and drier 24, and the other end of which connects with the suction side of compressor 14. Solenoid valve 28 and capillary tube 30 are arranged at one end portion of by-pass 26, and heat transfer tube 32 is provided at the intermediate portion of the passage. As is mentioned later, tube 32 is located in a regenerative material of regenerating apparatus 12, thus constituting heat exchanger 34 for heat accumulation in the regenerative material and heat absorption from the material.

As is shown in FIGS. 1 and 2, regenerating apparatus 12 comprises regenerative tank 40 with good heat insulating performance, and latent heat regenerative material 42 filling the tank. The regenerative material used is hydrated salt having a phase transition temperature (melting point) higher than the outside air temperature and serving to maintain a supercooled state. For example, the salt is sodium acetate hydrated salt with a phase transition temperature of 58° C. and a supercooling-release temperature of about −20° C. Heat exchanger 34 of refrigeration cycle 10 extends through the outer wall of regenerative tank 40, and is immersed in regenerative material 42. A refrigerant circulated through heat exchanger 34 exchanges heat with material 42, thereby heating the material or absorbing heat therefrom. Sheath heater 43 for heating material 42 is wound around the outer surface of tank 40.

Thermoelectronic cooling element 44, which constitutes part of supercooling control means, is located in the vicinity of inlet portion 34a of heat exchanger 34, inside regenerative tank 40. As is shown in FIG. 3, element 44 is a thermoelectronic cooling element which, having p- and n-type semiconductors 46 and 48, utilizes the Peltier effect. Metallic junction piece 50 is fixed to one side face of semiconductor 46, while metallic junction piece 52 is fixed to one side face of semiconductor 48. Metallic junction piece 54 is fixed to the respective other side faces of these semiconductors. The whole structure of element 44, constructed in this manner, is covered by thin coating film 55 which is formed of an insulator, e.g., epoxy resin. Element 44 is situated beside inlet portion 34a of heat exchanger 34 at which supercooling is most liable to be caused than at any other portions inside regenerative tank 40. Jig 56 is mounted on that side of element 44 on which junction pieces 50 and 52 are arranged. At inlet portion 34a, the jig is fixed to the outer peripheral surface of heat exchanger tube 32 by means of a bonding agent formed of epoxy resin.

As is shown in FIG. 2, temperature sensor 58 is located in the vicinity of inlet portion 34a inside regenerative tank 40. The sensor serves to detect the temperature of regenerative material 42 situated close to portion 34a. Drive unit 60 for driving cooling element 44 is located outside tank 40. Unit 60 includes power source section 62 and control section 64 connected thereto. In section 62, AC current from commercial power source 61 is converted into DC current. Power source section 62 is connected to element 44 through switch 65. Control section 64 is connected to temperature sensor 58 and heater 43.

When the temperature of regenerative material 42, detected by means of sensor 58, reaches a predetermined level set by means of control section 64 and when switch 65 is turned on, the control section actuates power source section 62, thereby energizing element 44. As is shown in FIG. 3, the DC current from drive unit 62 flows through junction piece 52, n-type semiconductor 48, junction piece 54, p-type semiconductor 46, and junction piece 50 in the order named. Thus, junction pieces 50 and 52 form a high-temperature heat radiating portion, while junction piece 54, on the other hand, forms a low-temperature heat absorbing portion which produces a cooling effect. Accordingly, regenerative material 42 surrounding the heat absorbing portion is rapidly cooled. In this embodiment, element 44 is capable of producing a temperature difference of 50° C. between the heat radiating and absorbing portions.

By shifting switch 65 to the other position, the DC current from power source section 62 is caused to flow in the direction opposite to the case of FIG. 3. Thereupon, junction piece 54 forms the heat radiating portion, while junction pieces 50 and 52 form the heat absorbing portion to produce the cooling effect.

The following is a description of the operation of the air conditioning apparatus constructed in this manner.

First, in cooling operation, the high-temperature, high-pressure refrigerant discharged from compressor 14 flows through four-way valve 16 into outdoor heat exchanger 20, whereupon it radiates heat and condenses. Subsequently, the refrigerant flows through expansion valve 22, capillary tube 23, and drier 24 to be decompressed, and then flows into indoor heat exchanger 18. Thereafter, the refrigerant in heat exchanger 18 absorbs ambient heat, thereby evaporating, and then returns to compressor 14 via valve 16.

In normal heating operation, the refrigerant discharged from compressor 14 flows through four-way valve 16, indoor heat exchanger 18, drier 24, capillary tube 23, expansion valve 22, outdoor heat exchanger 20, and valve 16. In the heat exchanger 18, the refrigerant condenses to produce a heating effect. During the cooling and heating operations, solenoid valve 28 is closed.

The following is a description of heating start operation using regenerating apparatus 12.

When starting heating operation one winter morning, for example, the components of refrigeration cycle 10 and the refrigerant are so cold that the refrigerant discharged from compressor 14 cannot be fully heated and pressurized. Thus, the refrigerant cannot produce a satisfactory heating effect in indoor heat exchanger 18.

In such a cold morning, therefore, the heating start operation is performed using regenerating apparatus 12. In this case, heat is previously accumulated in regenerative material 42 in apparatus 12 during the night, for example. The heat accumulation can be accomplished by energizing heater 43 by means of drive unit 60 to heat material 42. Thus, unit 60 causes heater 43 to heat and melt material 42 at night. If the temperature detected by sensor 58 becomes higher than the melting point, that is, the phase transition temperature at 58° C., the current supply to heater 43 is stopped. In this manner, the heat accumulation in regenerative material 42 is finished. Thereafter, drive unit 60 repeatedly turns heater 43 on and off, in accordance with the detected temperature from sensor 58, thereby keeping the regenerative material at the phase transition temperature or a little higher temperature, so that the amount of heat accumulated in the material can be maintained before the heating start operation is started.

The heating start operation is performed in this state. During this operation, solenoid valve 28 is opened. The refrigerant discharged from compressor 14 flows through four-way valve 16 into indoor heat exchanger 18, whereupon it condenses to produce the heating effect. Thereafter, most of the refrigerant flows into by-pass 26, while the remainder flows into outdoor heat exchanger 20 through drier 24, capillary tube 23, and expansion valve 22, whereupon it evaporates and then returns to compressor 14.

The refrigerant in by-pass 26 passes through solenoid valve 28 and capillary tube 30, whereupon it is decompressed to become a liquid of about 10° C., and then flows into heat exchanger 34. The processes of operation up to this point of time are executed in the order of several seconds after the start of the heating start operation. As the refrigerant passes through regenerator 34, it carries away heat from surrounding regenerative material 42, thereby rising its temperature and evaporating.

The moment the heating start operation is started, switch 65 of drive unit 60 is turned on, so that cooling element 44 is energized. Thus, junction pieces 50 and 52 form the heat radiating portion, while junction piece 54 forms the heat absorbing portion. The operation start temperature of control section 64 is set to 58° C. Substantially as soon as the operation is started, moreover, pieces 50 and 52 are cooled by the latent heat of evaporation of the refrigerant at about 10° C., flowing through heat exchanger 34, through the medium of the wall of heat exchanger tube 32 and jig 56. Thereafter, pieces 50 and 52 are kept at about 25° C. Thus, junction piece 54 on the heat absorption side is rapidly cooled to about −25° C. by energizing element 44. That portion of regenerative material 42 situated close to piece 54 is rapidly cooled to a temperature below the supercooling-off temperature of −20° C. in about 10 seconds, as indicated by broken-line curve A in FIG. 4. In the vicinity of junction piece 54, the regenerative material changes its phase or solidifies, thereby forming a nucleus for releasing the super-cooled state of the remaining material 42.

Figure 4:
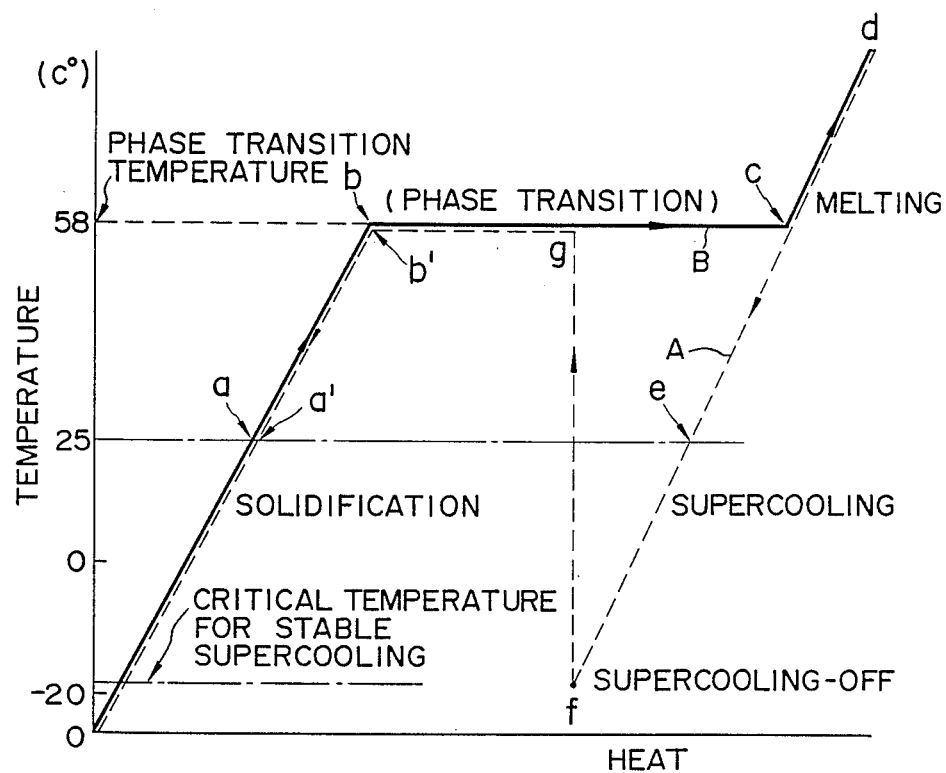

FIG. 4 shows a temperature change of regenerative material 42 when a sodium acetate hydrated salt is used as material 42. Since the sodium acetate hydrated salt has a stable supercooled-state, it can exist in a liquid phase at 25° C. (point e). When regenerative material 42 is heated along solid lines B from the solid state (point a) and liquefiled and then cooled, the liquid state (point e) can be maintained at room temperature. As is indicated by broken-line A, when regenerative material 42 is further cooled from point e to supercooling-off temperature of −20° C. (point f), the supercooled-state is released and the temperature of material 42 rises to point g. At this state, solidification of material 42 starts. During a period from point g to b′, material 42 is kept at the phase change temperature of 58° C., and discharges latent heat. The solidification is completed at point b′, and material 42 is set in the solid phase.

If the entire regenerative tank is cooled to a supercooling-off temperature, the supercooled-state of regenerative material 42 can be released. However, in this case, the latent heat between points g and c cannot be utilized over the entire regenerative tank 40. Under the circumstance, cooling element 44 is used for quickly and locally cooling only a small portion of the regenerative material near junction piece 54, thereby to solidify this portion and use the same as a nucleus for releasing the supercooled-state of the other part of the regenerative material.

Since the heat of regenerative material 42 is absorbed by the refrigerant flowing through heat exchanger 34, as mentioned before, the temperature of the entire regenerative material drops. If the temperature of the regenerative material is reduced to a level below the phase transition temperature, the material is brought to the supercooled state. By this time, however, that portion of the regenerative material near heat absorbing portion 54 of cooling element 44 is already changed in phase, thus forming the nucleus. Accordingly, the change of phase propagates to the supercooled portion of the regenerative material around the nucleus, thereby releasing the supercooled state at once. Such release of the supercooled state gradually propagates to all the regenerative material in regenerative tank 40. As a result, material 42 solidifies without maintaining the supercooled state for a long period of time, thus radiating latent heat having so far been stored therein. The refrigerant flowing through regenerator 34 absorbs the radiated latent heat from material 42, thereby rising its temperature.

The refrigerant is fully heated as it passes through heat exchanger 34, and is then returned to compressor 14. Thus, refrigerating cycle 10 can efficiently produce the heating effect in a short time after the start of the heating operation.

According to regenerating apparatus 12 constructed in this manner, thermoelectronic cooling element 44 is arranged in regenerative tank 40 so that its heat radiating and absorbing portions are immersed in regenerative material 42. When material 42 is cooled by the refrigerant flowing through heat exchanger 34, therefore, the temperature of the heat radiating portion of element 44 lowers correspondingly. Since the heat absorbing portion is cooled corresponding to the capacity of element 44, in accordance with the temperature of the heat radiating portion, the cooling temperature of the absorbing portion also fully lowers in response to the temperature drop of the radiating portion. Accordingly, cooling element 44 can cool the heat absorbing portion to a temperature below the supercooling-off temperature without being influenced by change of the outside air temperature. Thus, the supercooled state of regenerative material 42 can be securely released.

In the present embodiment, in particular, the heat radiating portion of cooling element 44 is fixed to the wall of heat exchanger 34 by means of jig 56, so that it is cooled by the refrigerant flowing through heat exchanger 34. Even though the outside air temperature varies between about 0° C. and 20° C., the temperature of the refrigerant flowing into heat exchanger 34 can be automatically adjusted to a predetermined temperature, e.g., 10° C., set by means of refrigeration cycle 10. Thus, the heat radiating portion of element 44 on inlet portion 34a of heat exchanger 34 is cooled by means of the refrigerant of 10° C. immediately after the introduction thereof into heat exchanger 34, and is kept at the fixed temperature without being influenced by the outside air temperature. In consequence, the heat absorbing portion is also kept stably at a target temperature below the supercooling-off temperature, so that the supercooled state of regenerative material 42 can be more securely released.

Since the heat absorbing portion of element 44 is arranged in regenerative material 42, moreover, the release of the supercooled state of that portion of the material situated close to the absorbing portion is propagated at once to the surrounding portion of the material. Accordingly, the supercooled state of all the regenerative material can be released without any substantial time delay. Thus, heat can be taken out from regenerative material 42 to be utilized for the operation of refrigeration cycle 10, without entailing any delay.

Thus, regenerating apparatus 12 can remove the supercooled state of regenerative material 42 securely and quickly, so that the refrigerant flowing through heat exchanger 34 can be heated fully and rapidly by means of latent heat and actual heat having so far been stored in the regenerative material, during the heating start operation of the air conditioner. Accordingly, the air conditioner can perform high-efficiency heating operation immediately after the start of the operation.

Figure 5:
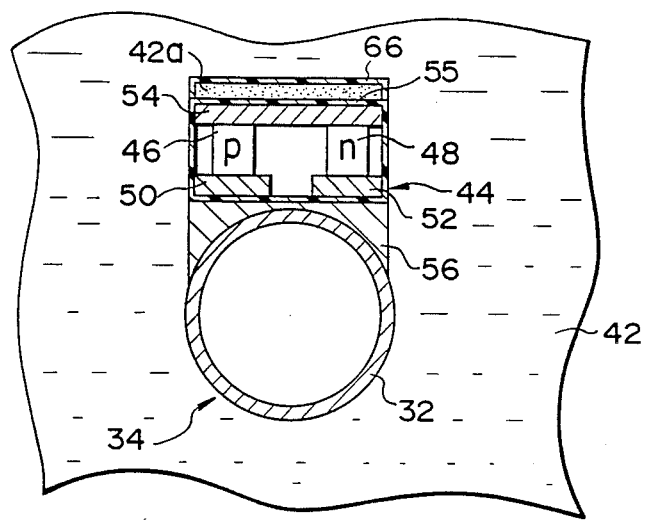
FIG. 5 is a sectional view showing a first modification of the supercooling control device.

In the embodiment described above, thermoelectronic cooling element 44 is energized during the heating start operation. Alternatively, however, element 44 may be operated at night to cool that portion of the regenerative material near the heat absorbing portion. By doing this, the solidified nucleus of the regenerative material may be formed in the vicinity of the absorbing portion before the start of the heating start operation. Preferably, in this case, element 44 should be provided with cover 66 which faces junction piece 54 or the heat absorbing portion at a predetermined distance, e.g., about 1 mm, therefrom, as is shown in FIG. 5. Cover 66, which is formed of a material with high heat insulating performance, thermally isolates regenerative material portion 42a between the heat absorbing portion and cover 66 from the surrounding portion of regenerative material 42. However, material portion 42a communicates with material 42. Thus, material portion 42a can stably maintain its solidified state during the operation of element 44. When the temperature of regenerative material 42 in regenerative tank 40 is gradually lowered after the start of the heating start operation, material 42 is stimulated by material portion 42a in the form of the nucleus thereby changing its phase or solidifying immediately.

Alternatively, the heat stored in the regenerative material may be utilized for the operation of the refrigeration cycle by a method different from the method of the aforementioned embodiment.

According to this alternative method, heater 43 is energized at night to heat and melt regenerative material 42, and the current supply to the heater is then stopped. As a result, regenerative tank 40 and regenerative material 42 therein are cooled by the outside air. If the outside air temperature is 0° C., for example, material 42 will have been cooled to a temperature of about 10° C. and brought to the supercooled state, without solidifying, by the next morning. If current is applied to cooling element 44 at the start of the heating start operation, the heat from junction pieces 50 and 52, which constitute the heat radiating portion, is absorbed by regenerative material 42 of 10° C. Thus, the temperature of pieces 50 and 52 becomes 20 to 20° C. at the highest. Accordingly, junction piece 54, which constitutes the heat absorbing portion, is cooled to −20° C. or below, so that the supercooled state of regenerative material 42 in the vicinity of the absorbing portion is released. This release of the supercooled state gradually propagates to all the regenerative material, so that the material solidifies, thus radiating latent heat. In consequence, the refrigerant flowing through heat exchanger 34 can be fully heated by means of the latent heat radiated from regenerative material 42.

The same advantages of the aforementioned embodiment can be also obtained by the method described above.

Figure 6:
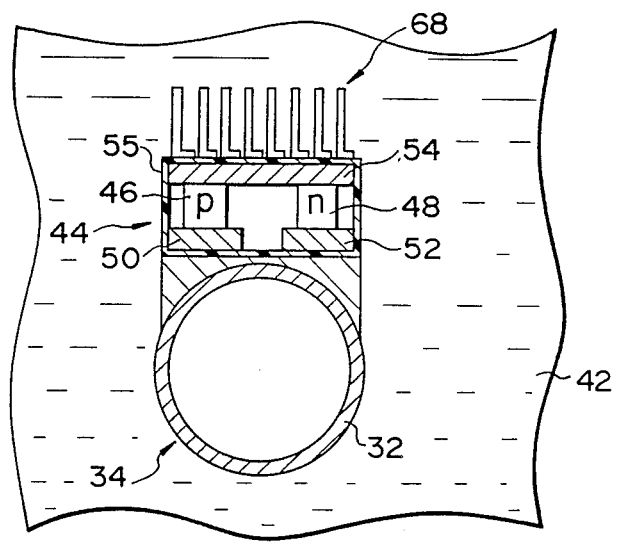
FIG. 6 is a sectional view showing a second modification of the supercooling control device.

In the foregoing embodiment, a plurality of fins 68 may be attached to the outer surface of that portion of element 44 near junction piece 54, as is shown in FIG. 6, so that the efficiency of the heat exchange between piece 54 and regenerative material 42 is improved.

FIG. 7 shows another air conditioner with latent heat regenerating apparatus 12 according to the present invention.

This second embodiment differs from the aforementioned first embodiment in that heat stored in regenerating apparatus 12 is utilized for the cooling operation of refrigeration cycle 10.

As shown in FIG. 7, refrigeration cycle 10 includes compressor 14, indoor and outdoor heat exchangers 18 and 20 connected to the compressor through four-way valve 16, and expansion valve 22, capillary tube 23, and drier 24, connected between the heat exchangers. The refrigeration cycle also includes by-pass 26, one end of which is connected between heat exchanger 18 and drier 24, and the other end of which is connected between valve 16 and the suction side of compressor 14. First solenoid valve 28 and capillary tube 30 are arranged at one end portion of by-pass 26, and heat transfer tube 32 is provided at the intermediate portion of the passage. Refrigeration cycle 10 further includes short-circuit passage 72, one end of which is connected between four-way valve 16 and heat exchanger 20, and the other end of which is connected between the suction side of compressor 14 and heat exchanger tube 32.

Three-way valve 70 is provided at the junction of by-pass 26 and passage 72. Furthermore, second solenoid valve 76 is located between by-pass 26 and heat exchanger 18.

Meanwhile, latent heat regenerating apparatus 12 is constructed in the same manner as that of the first embodiment. In the explanation of apparatus 12 to follow, like reference numerals are used to designate like portions, and a detailed description of those portions is omitted. In the second embodiment, however, water is used as regenerative material 42.

The following is a description of the operation of the air conditioner constructed in this manner.

In normal cooling operation, first and second solenoid valves 28 and 76 are closed and open, respectively, and three-way valve 70 is in a first position where it allows heat transfer tube 32 and compressor 14 to connect with each other. Thus, the refrigerant discharged from compressor 14 flows through four-way valve 16 into outdoor heat exchanger 20, whereupon it radiates heat and condenses. Subsequently, the refrigerant passe through expansion valve 22 to be decompressed, and then flows into indoor heat exchanger 18. Hereupon, the refrigerant absorbs heat from its surrounding material and evaporates, thereby producing the cooling effect. Thereafter, the refrigerant returns to compressor 14 via valve 16.

In performing the cooling operation by utilizing regenerating apparatus 12, latent heat is previously accumulated in regenerative material 42 at night, by solidifying the material. In this regenerative operation, first and second solenoid valves 28 and 76 are open and closed, respectively, and three-way valve 70 is in the first position. Thus, the refrigerant discharged from compressor 14 passes through outdoor heat exchanger 20 to be condensed, and is then decompressed by expansion valve 22. Subsequently, the refrigerant flows into by-pass 26, and then flows through solenoid valve 28 and capillary tube 30 into tube 32 or heat exchanger 34. Then, the refrigerant absorbs heat from the surrounding regenerative material, thereby evaporating, as it passes through heat exchanger 34. Thereafter, the refrigerant returns to compressor 14.

The moment the regenerative operation is started, switch 65 of drive unit 60 of the supercooling control means is turned on, and the operation start temperature of control section 64 is set to 0° C. When regenerative material 42 is cooled by the refrigerant flowing through heat exchanger 34 so that its temperature is lowered to 0° C., sensor 58 detects this, and current supply to cooling element 44 is started. Thus, junction piece 54 of element 44 forms the heat radiating portion, while junction pieces 50 and 52 form the heat absorbing portion. At this time, element 44, which is located in regenerative material 42, is cooled together with the material to about 0° C. The moment element 44 is energized, therefore, heat absorbing portions 50 and 52 are rapidly cooled to the supercooling-off temperature, i.e., about −12° C., or below. Thus, that portion of regenerative material 42 near pieces 50 and 52 is also rapidly cooled to the supercooling-off temperature or below, thereby changing its phase or solidifying.

The solidified portion of regenerative material 42 forms a nucleus. When the temperature is lowered to 0° C., that portion of the regenerative material around heat exchanger 34, which is cooled by means of the refrigerant flowing through heat exchanger 34, changes its phase or solidifies. Once any of regenerative material 42 solidifies in this manner, the solidified portion forms the nucleus which propagates the phase change to the surrounding regenerative material portion. As a result, the regenerative material solidifies and accumulates latent heat therein, without being super-cooled. If the operation of refrigeration cycle 10 is continued after all the regenerative material is solidified, the regenerative material is cooled to the limit of the cooling capacity of cycle 10, e.g., −4° C. Thus, the accumulation of latent heat by solidifying in regenerative material 42 is finished.

In performing the cooling operation during the daytime, for example, by utilizing the heat accumulated in this manner, first and second solenoid valves 28 and 76 are opened, and three-way valve 70 is shifted to a second position where it allows short-circuit passage 72 and heat exchanger 34 to connect with each other. Thus, the refrigerant discharged from compressor 14 passes through four-way valve 16, so that most of the refrigerant flows through passage 72 and valve 70 into heat exchanger 34, while the remainder flows into outdoor heat exchanger 20. The refrigerant introduced into heat exchanger 34 absorbs heat from solidified regenerative material 42 as it passes through it, so that the refrigerant is cooled to be condensed. Thereafter, the refrigerant passes through capillary tube 30 to be decompressed, and then flows into indoor heat exchanger 18. The refrigerant introduced into outdoor heat exchanger 20, on the other hand, is condensed therein, passes through expansion valve 22 to be decompressed thereby, and then flows into indoor heat exchanger 18. The refrigerant introduced into heat exchanger 18 absorbs heat from the surrounding material, thereby evaporating to produce the cooling effect. Finally, the refrigerant is returned to compressor 14 via four-way valve 16.

In performing the cooling operation by utilizing regenerating apparatus 12 in this manner, the refrigerant discharged from the compressor can be cooled to be fully condensed by means of regenerative material 42. Immediately after the start of the cooling operation, the refrigerant can be fully evaporated for a good cooling effect by means of indoor heat exchanger 18. Thus, the cooling capacity of the refrigeration cycle is improved. At the same time, almost the refrigerant is cooled to be condensed by means of regenerative material 42, so that the working load of compressor 14, and hence, power consumption, can be reduced. Consequently, the apparatus of this embodiment can contribute to the reduction of intensive power consumption which may be caused, for example, by the intensive summer use of air conditioners in many homes, factories, etc.

Also in the second embodiment constructed in this manner, thermoelectronic cooling element 44 is arranged in regenerative tank 40 so that its heat radiating and absorbing portions are immersed in regenerative material 42. When material 42 is cooled by the refrigerant flowing through heat exchanger 34, therefore, the temperature of the heat radiating portion lowers correspondingly. Since the heat absorbing portion is cooled corresponding to the capacity of element 44, in accordance with the temperature of the heat radiating portion, the cooling temperature of the absorbing portion also fully lowers in response to the temperature drop of the absorbing portion. Accordingly, cooling element 44 can securely cool the heat absorbing portion to a temperature below the supercooling-off temperature without being influenced by change of the outside air temperature. Thus, during the regenerative operation, the regenerative material can be securely prevented from being supercooled, and the heat accumulation in the material can be effected with high efficiency.

Water, which is used as the regenerative material in the embodiment described above, can accumulate latent heat of 80 cal per gram when its transformation from the liquid phase to the solid phase takes place. If the water is supercooled and makes no phase change, however, it can accumulate latent heat of only 1 cal per gram for a temperature change of 1° C. This indicates how efficiently the heat accumulation can be effected by preventing the regenerative material from being supercooled during the regenerative operation.

Since the heat absorbing portion of element 44 is located in regenerative material 42, the phase change of that portion of the regenerative material situated close to the absorbing portion is propagated immediately to the surrounding material portion. Thus, the phase change or solidification of all the regenerative material can be achieved without entailing any substantial time delay.

What is claimed is:

1. A latent heat regenerating apparatus comprising:
a regenerative tank;
a latent heat regenerative material in the regenerative tank, having a phase transition temperature and a supercooling-release temperature, said regenerative material being capable of maintaining a supercooled state in a temperature range between said temperatures;
a heat exchanger arranged in the regenerative material and allowing circulation of a refrigerant so that heat is exchanged between the refrigerant and the regenerative material; and
supercooling control means for controlling supercooling of the regenerative material, said control means including a thermoelectronic cooling element arranged in the regenerative material, said element having a heat radiating portion for radiating heat into the regenerative material and a heat absorbing portion for absorbing heat from the regenerative material, said element being arranged so that heat is transferred between a surface of the heat exchanger and one of the heat radiating and absorbing portions.

2. An apparatus according to claim 1, wherein said control means includes a drive unit for energizing the cooling element to cool the heat absorbing portion to a temperature lower than the supercooling-off temperature when the temperature of the regenerative material in a liquid phase is lowered to the phase transition temperature.

3. An apparatus according to claim 2, wherein said rive unit includes a sensor located in the regenerative material to detect the temperature of the material, a driving power source, and a control section for applying an electric current from the driving power source to the cooling element when the temperature detected by the sensor attains a predetermined temperature level.

4. An apparatus according to claim 1, wherein said cooling element includes a first junction piece fixed to the surface of the heat exchanger, a second junction piece facing the first junction piece at a predetermined distance therefrom, p- and n-type semiconductors arranged spaced between the junction pieces, and said drive unit includes a changeover switch connected between the driving power source and the cooling element, said switch being shiftable between a first position, in which the electric current from the driving power source is caused to flow in a forward direction so that the first and second junction pieces form the heat radiating and absorbing portions, respectively, and a second position in which the current from the driving power source is caused to flow in a reverse direction so that the first and second junction pieces form the heat absorbing and radiating portions, respectively.

5. An apparatus according to claim 4, wherein said heat exchanger includes an inflow end portion and an outflow end portion, said first junction piece of the cooling element is fixed to the surface of the inflow end portion, and said sensor is located in the vicinity of the inflow end portion.

6. An apparatus according to claim 4, wherein said cooling element includes a plurality of fins attached to the second junction piece to foster heat transfer between the second junction piece and the regenerative material.

7. An apparatus according to claim 4, wherein said cooling element includes a cover facing the second junction piece at a predetermined distance therefrom, said cover thermally insulating that portion of the regenerative material situated between the second junction piece and the cover from the surrounding regenerative material portion.

8. An apparatus according to claim 1, which further comprises heating means for heating the regenerative material to melt it.

9. An apparatus according to claim 8, wherein said heating means includes an electric heater wound around the regenerative tank.

10. An apparatus according to claim 1, wherein said supercooling control means includes a drive unit for energizing the cooling element to cool the heat absorbing portion to a temperature lower than the supercooling-release temperature when the regenerative material is in the supercooled state.

11. A latent heat regenerating apparatus comprising:
a regenerative tank;
a latent heat regenerative material in the regenerative tank, having a phase transition temperature and a supercoolingoff temperature, said regenerative material being capable of maintaining a supercooled state in a temperature range between said temperatures;
a heat exchanger arranged in the regenerative material and allowing circulation of a refrigerant so that heat is exchanged between the refrigerant and the regenerative material; and
supercooling preventing means for preventing the regenerative material from being supercooled, said preventing means including a thermoelectronic cooling element which is located in the regenerative material and has a heat radiating portion for radiating heat into the regenerative material and a heat absorbing portion for absorbing heat from the regenerative material, and a drive unit for driving the cooling element to cool the heat absorbing portion to a temperature lower than the supercooling-release temperature when the temperature of the regenerative material is lowered from a level above the phase transition temperature to a level lower than the phase transition temperature, said element being arranged so that heat is transferred between a surface of the heat exchanger and one of the heat radiating and absorbing portions.

12. A latent heat regenerating apparatus comprising:
a regenerative tank;
a latent heat regenerative material in the regenerative tank, having a phase transition temperature and a supercoolingrelease temperature, said regenerative material being capable of maintaining a supercooled state in a temperature range between said temperatures;
a heat exchanger arranged in the regenerative material and allowing circulation of a refrigerant so that heat is exchanged between the refrigerant and the regenerative material; and
supercooling release means for releasing the supercooled state of the regenerative material, said release means including a thermoelectronic cooling element located in the regenerative material and having a heat radiating portion for radiating heat into the regenerative material and a heat absorbing portion for absorbing heat from the regenerative material, and a drive unit for driving the electronic refrigerating element to cool the heat absorbing portion to a temperature lower than the supercooling release temperature when the regenerative material is in the supercooled state, said element being arranged so that heat is transferred between a surface of the heat exchanger and one of the heat radiating and absorbing portions.

13. An air conditioner comprising:
a refrigeration cycle capable of cooling and heating operations, said refrigeration cycle including a compressor, a four-way valve connected to discharge and suction sides of the compressor, an indoor heat exchanger connected to the fourway valve, and outdoor heat exchanger connected to the four-way valve, and pressure reducing means connected between the heat exchangers; and
a latent heat regenerating apparatus including a regenerative tank, a latent heat regenerative material in the regenerative tank, having a phase transition temperature and a supercooling-release temperature, said regenerative material being capable of maintaining a supercooled state in a temperature range between said temperatures, a heat exchanger arranged in the regenerative material and allowing circulation of a refrigerant so that heat is exchanged between the refrigerant and the regenerative material, and supercooling control means for controlling supercooling of the regenerative material, said control means including a thermoelectronic cooling element located in the regenerative material, said element having a heat radiating portion for radiating heat into the regenerative material and a heat absorbing portion for absorbing heat from the regenerative material, said element being arranged so that heat is transferred between a surface of the heat exchanger and one of the heat radiating and absorbing portions, whereby the heat accumulated in the regenerative material is supplied to a refrigerant flowing through the refrigerating cycle.

14. An air conditioner according to claim 13, wherein said refrigeration cycle includes a by-pass having one end connected between the indoor and outdoor heat exchangers and another end connecting with the suction side of the compressor, said heat exchanger being provided in the by-pass, and valve means for regulating the flow of the refrigerant so that the refrigerant discharge rom the indoor heat exchanger, at the start of the heating operation, flows into the by-pass absorbs heat from the regenerative material, thereby increasing the temperature of the refrigerant, as the refrigerant passes through the heat exchanger, and then return to the compressor.

15. An air conditioner according to claim 14, wherein said supercooling control means includes a drive unit for driving the cooling element to cool the heat absorbing portion to a temperature lower than the supercooling-release temperature when the temperature of the regenerative material is lowered from a level above the phase transition temperature to a level lower than the phase transition temperature, at the start of the heating operation, so that the regenerative material is prevented from being supercooled.

16. An air conditioner according to claim 14, wherein said supercooling control means includes a drive unit for driving the cooling element to cool the heat absorbing portion to a temperature lower than the supercooling-release temperature when the regenerative material is in the supercooled state, at the start of the heating operation, so that the supercooled state of the regenerative material is released.

17. An air conditioner according to claim 13, wherein said regenerating apparatus includes means for heating the regenerative material to melt it.

18. An air conditioner according to claim 13, wherein said refrigerating cycle includes a by-pass having one end connected between the indoor and outdoor heat exchangers and the other end connecting with the suction side of the compressor, a heat exchanger provided in the by-pass and located in the regenerative material of the regenerating apparatus, a short-circuit passage having one end connected between the heat exchanger and the suction side of the compressor and the other end connected between the four-way valve and the outdoor heat exchanger, and valve means for regulating the flow of the refrigerant so that the refrigerant discharged from the outdoor heat exchanger flows into the by-pass, absorbs heat from the regenerative material, thereby cooling the regenerative material, as the refrigerant passes through the heat exchanger, and then returns to the compressor, and that the refrigerant discharged from the compressor, at the start of the cooling operation, flows through the short-circuit passage and the by-pass, is cooled to be condensed by the regenerative material as the refrigerant passes through the heat exchanger, and then flows into the indoor heat exchanger.

19. The apparatus according to claim 18, wherein said supercooling control means includes a drive unit for driving the cooling element to cool the heat absorbing portion to a temperature lower than the supercooling-release temperature when the temperature of the regenerative material is lowered from a level above the phase transition temperature to a level lower than the phase transition temperature, as the regenerative material is cooled by the refrigerant flowing through the heat exchanger, so that the regenerative material is prevented from being supercooled.

* * * * *